US009780661B2

United States Patent
Chakraborty et al.

(10) Patent No.: US 9,780,661 B2
(45) Date of Patent: Oct. 3, 2017

(54) HIGH EFFICIENCY DC-DC CONVERTER WITH ACTIVE SHUNT TO ACCOMMODATE HIGH INPUT VOLTAGE TRANSIENTS

(71) Applicant: Texas Instruments Incorporated, Dallas, TX (US)

(72) Inventors: Sombuddha Chakraborty, Redwood City, CA (US); Yogesh Kumar Ramadass, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 61 days.

(21) Appl. No.: 14/926,555

(22) Filed: Oct. 29, 2015

(65) Prior Publication Data

US 2017/0126120 A1    May 4, 2017

(51) Int. Cl.
  *H02M 3/156* (2006.01)
  *H02M 3/158* (2006.01)
  *H02M 1/08* (2006.01)
  *H02M 3/06* (2006.01)
  *H02M 1/00* (2006.01)
  *H02M 3/07* (2006.01)

(52) U.S. Cl.
  CPC ............ *H02M 3/158* (2013.01); *H02M 1/08* (2013.01); *H02M 3/06* (2013.01); *H02M 3/156* (2013.01); *H02M 3/1588* (2013.01); H02M 2001/0009 (2013.01); H02M 2003/072 (2013.01)

(58) Field of Classification Search
  CPC ................ H02M 3/06; H02M 3/07; H02M 3/156–3/1588; H02M 2003/072
  See application file for complete search history.

(56) References Cited

U.S. PATENT DOCUMENTS

| 8,907,642 | B1 | 12/2014 | Burstein et al. | |
| 9,106,201 | B1 | 8/2015 | Chakraborty et al. | |
| 2009/0033293 | A1* | 2/2009 | Xing | H02J 7/0077 320/164 |
| 2015/0207401 | A1* | 7/2015 | Zhang | H02M 3/158 323/271 |
| 2015/0244269 | A1 | 8/2015 | Yu et al. | |
| 2015/0311792 | A1* | 10/2015 | Amaro | H02M 1/08 323/271 |
| 2016/0020693 | A1* | 1/2016 | Ribarich | H02M 3/156 363/60 |

* cited by examiner

*Primary Examiner* — Timothy J Dole
*Assistant Examiner* — Ishrat Jamali
(74) *Attorney, Agent, or Firm* — John R. Pessetto; Charles A. Brill; Frank D. Cimino

(57) ABSTRACT

Switch mode power supplies and integrated circuits are presented to provide a DC output voltage signal using high and low side switches, with a switching control circuit to turn off the high side switch and engage an active shunt circuit to provide a reduced voltage to continue converter operation to accommodate high input voltage transients when the DC input voltage exceeds a threshold voltage without requiring an oversized low side switch for improved efficiency through reduced switching and conduction losses in normal operation.

22 Claims, 15 Drawing Sheets

HIGH EFFICIENCY DC-DC CONVERTER WITH ACTIVE SHUNT TO ACCOMMODATE HIGH INPUT VOLTAGE TRANSIENTS

TECHNICAL FIELD

The present disclosure relates generally to power conversion and more particularly to DC-DC converter circuits.

BACKGROUND

Switching regulators are used in a variety of applications to provide controlled DC output power by converting a DC input voltage. In automotive, industrial and aviation applications, a battery and alternator combination often provides the DC input voltage to a DC bus to power the DC-DC switching converter. In many automotive examples, the DC bus voltage ranges from 8-16 V, and buck DC-DC converters are used to provide 3.3 V or 5.0 V outputs to power motor control and other circuitry. However, high input voltage transient conditions may occur, for example, if the battery is disconnected, leading to a voltage rise on the DC bus. In this situation, the buck DC-DC converter high and low side switching devices may need to block voltages as high as 40 V or more during the high input voltage transient event. Accordingly, buck DC-DC converters used to supply 3.3-5.0 V outputs from 8-16 V inputs are designed with high and low side driver components capable of blocking 40 V. This leads to higher on-state resistance (e.g., FET RDSON) and switch capacitance due to higher rated devices. This results in increased on-state conduction and switching loss in normal operation due to the oversizing of the high and low side switches to accommodate the high input voltage transient possibility.

SUMMARY

Disclosed examples include methods, power conversion systems, power supplies and integrated circuits with first and second switching devices connected to a switching node to control a DC output voltage signal. In normal operation in one example, the first and second switches operate as high and low side buck converter switches, and the switching node may be coupled to an output inductor to drive a load. When the DC input voltage exceeds a threshold voltage, the circuit enters a second mode in which a switching control circuit turns off the high side switch and engages a second supply circuit, such as an active shunt circuit, to provide a reduced voltage to continue converter operation to accommodate high input voltage transients. The low side switching device does not need to be oversized because the switching node is disconnected from the DC input voltage during high input voltage transients, and the threshold voltage can be set in certain examples to a level below the blocking voltage rating of the second switching device. In this manner, high-efficiency is facilitated during normal operation by reducing switching loss and conduction losses in the low side switch. In certain examples, the shunt circuit is a switched capacitor circuit including one or more transistors that are operated during shunt mode operation, with one or more capacitors charged and discharged through the output inductor. One or more of the shunt circuit transistors can be operated as a high side converter switch to continue DC-DC converter operation during high input voltage transient conditions, and the shunt circuit and the low side switch can be operated in open loop or closed loop fashion to maintain DC-DC converter operation until the transient condition ends and normal operation resumes. In certain examples, moreover, a third switch is provided between the shunt circuit output and the switching node, which is turned off during normal operation and enabled during transient operation to act as a high side converter switch.

DETAILED DESCRIPTION

Figure 1:
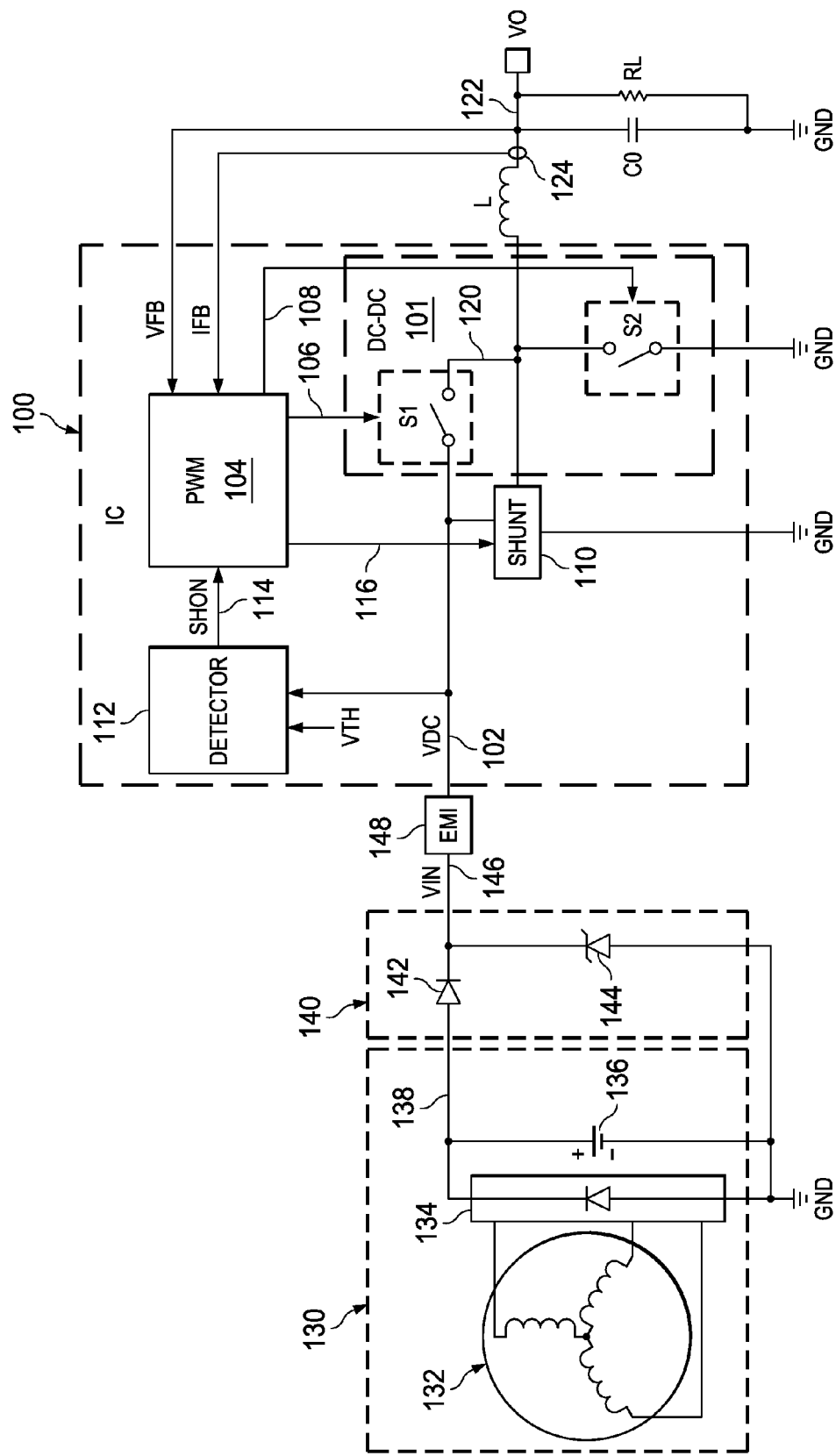
FIG. 1 is a schematic diagram of an integrated circuit with a DC-DC converter supplied by an alternator, rectifier and battery, including an active shunt circuit to accommodate high input voltage transients.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical connection or combinations thereof. For example, if a first device couples to or is coupled with a second device, that connection may be through a direct electrical connection, or through an indirect electrical connection via one or more intervening devices and connections.

FIG. 1 shows a power conversion system including an integrated circuit (IC) 100 with a DC-DC converter circuit 101 to provide a DC output voltage VO at an output node 122 to drive a load shown as a load resistor RL. The DC-DC converter 101 includes a DC input node 102 V that receives a DC input voltage VDC, and provides a switching node 120 connected through an output inductor L to the output node 122. In certain examples, the inductor L can be included within the IC 100. In other examples, the inductor L is an external device outside the IC 100. As shown in FIG. 1, an output capacitor CO is connected between the output node 122 and a constant voltage node or ground GND. The IC 100 receives the input voltage VDC in this example from an automotive supply 130 including an alternator 132 and an associated rectifier 134 as well as a battery 136 with a positive terminal connected to a node 138 and a negative terminal (−) connected to a circuit ground connection GND. The battery/alternator/rectifier circuit 130 provides a DC voltage at the node 138, for example, 8-16 V in one automotive implementation to a protection circuit 140 including a blocking diode 142 and a TVS or other protection device 144. The circuit 140 provides an input voltage VIN at node 146 to an optional electromagnetic interference (EMI) filter 148. The EMI filter circuit 148 in this example provides the input voltage VDC to the DC input node 102 of the IC 100.

The IC 100 operates in a first mode, referred to herein as NORMAL mode, and a second mode, referred to herein as SHUNT mode. The DC-DC converter 101 includes a first switching device S1 operating in the normal mode as a high side switching device of a buck converter configuration, as well as a second switching device S2 operating as a low side switching device. Although the illustrated examples include buck converters, the various concepts of the present disclosure can be used in connection with other forms of DC-DC converter circuits 101, including without limitation buck converters, boost converters, buck-boost converters, cuk converters, etc. The switches S1 and S2 can be any suitable transistor switch, including without limitation field effect transistors (FETs), bipolar transistors, IGBTs, IGCTs, wide bandgap devices, etc. The switching devices S1 and S2 of the DC-DC converter circuit 101 are operated by control signals from a switching control circuit 104. In one example, the switching control circuit 104 includes a logic circuitry and driver circuits suitable for providing control signals to selectively turn on or off the switches S1 and S2, and the control circuit 104 includes further circuits to provide control signals to other circuitry in the IC 100. The first or high side DC-DC converter switch S1 is coupled between the DC input node 102 and the switching node 120, and is operated (e.g., closed or opened) according to a first switching control signal 106 from the PWM control circuit 104. The second switching device S2 is closed or opened according to a second switching control signal 108 from the control circuit 104.

In order to accommodate high input voltage transient conditions, the IC 100 includes a detector circuit 112 with an input coupled to the DC input node 102, as well as an auxiliary or second power supply circuit, such as a shunt circuit 110 connected in this example to the input node 102 and the switching node 120. The detector circuit 112 includes an input coupled to the DC input node 102, as well as an output 114 to provide a mode control signal SHON to the control circuit 104 in one example, the detector circuit 112 includes a voltage comparator (not shown) or other suitable circuitry to compare the input voltage VDC with a threshold voltage VTH. The threshold voltage VTH can be an internal reference circuit formed as part of the IC 100, or the IC 100 can include a terminal for connection of an external threshold voltage source to supply the threshold voltage VTH. In one example, the threshold voltage VTH is approximately 20 V. In certain examples, the threshold voltage VTH is less than the rated blocking voltage of the second switching device S2. As previously noted, for automotive or other applications in which the input voltage VDC may undergo overvoltage conditions and perhaps reach as high as 40 V, the low side switching device S2 would need to block this elevated DC voltage level. However, in the illustrated examples, the second switch S2 does not need to be oversized, and can be sized for blocking 20 V or lower. For a second switching device S2 capable of blocking 20 V, in one example, the threshold voltage VTH can be set to some level below 20 V. The detector circuit 112 provides the mode control signal SHON to the control circuit 104 in a first state (e.g., LO) when the input voltage VDC is less than or equal to the threshold voltage VTH, and provides the signal SHON in a second state (e.g., HI) when the input voltage VDC at the DC input node 102 is greater than the threshold voltage VTH.

The control circuit 104 in one example provides one or more shunt circuit switching control signals 116 to the shunt circuit 110 in response to receiving the mode control signal SHON in the second state. In this manner, the control circuit 104 switches to a second operating mode (SHUNT mode) and activates the shunt circuit 110 when the detector circuit 112 indicates that the DC input voltage VDC is undergoing an overvoltage transient event. In one example, the detector circuit 112 maintains the mode control signal SHON in the second state for as long as the input voltage VDC remains above the threshold voltage VTH. When the input voltage VDC is again less than or equal to the threshold voltage VTH, the detector circuit 112 resets the mode control signal SHON to the first state to place the control circuit 104 in the first operating mode (NORMAL mode). In one example, the control circuit 104 turns off all transistors of the active shunt circuit 110 in the first mode by providing one or more control signals 116 accordingly. In the first mode, moreover, the control circuit 104 operates the first and second switching devices S1 and S2 as high and low side switch is of a buck converter configuration in one example, to regulate the output voltage VO at the output node 122 according to one or more feedback signals. In one example, the control circuit 104 provides the switching control signals 106, 108 according to a voltage feedback signal VFB representing the output voltage VO and/or according to a current feedback signal IFB from a current sensor 124 in order to implement any suitable closed loop DC-DC converter regulation or control scheme, such as peak or valley current control, voltage regulation, etc. For example, the control circuit 104 may compare one or more feedback signals to a setpoint signal (not shown) to regulate the output voltage VO to a target level, such as 3.3 or 5.0 V.

The active shunt circuit 110 is operative according to the shunt circuit is operative according to one or more shunt circuit control signals 116 from the control circuit 104 to provide a shunt circuit output voltage signal at a voltage level less than the input voltage VDC. In the second operating mode (SHUNT mode) when the input voltage VDC exceeds the threshold voltage VTH, the shunt circuit 110 is activated by the control circuit 104, and provides a shunt circuit output voltage to the switching node 120 at approximately VDC/2 one example. The switching control circuit 104 is operative in the second mode to provide the first switching control signal 106 to turn off the first switching device S1. The switching node 120 of the buck converter example is therefore disconnected from the elevated DC input voltage VDC at the node 102. In the second mode, the switching control circuit 104 also provides the second switching control signal 108 and the shunt circuit switching control signal or signals 116 in order to operate the active shunt circuit 110 and the second switching device S2 in order to control the output voltage signal VO. In this manner, DC-DC conversion is continued throughout a high input voltage transient situation, with the second switch S2 continuing operation as a low side converter switch, and the shunt circuit 110 performing the high side switching functions at a voltage less than the elevated DC input voltage VDC. This, in turn, allows the second switch S2 to be sized according to efficiency considerations, with the selective operation of the shunt circuit 110 preventing the second switch S2 from having to block elevated DC voltages. In one example, for an automotive application having a nominal bus voltage in the range of 8-16 V, with the alternator 132 providing the potential for high input voltage excursions to approximately 40 V, the switching control circuit 104 operates in the second mode to provide the shunt circuit switching control signal(s) 116 to control the shunt circuit alters level at approximately half the input voltage (e.g., VDC/2=20 V in this example).

In other examples, the active shunt circuit 110 is operated according to the shunt circuit switching control signal or signals 116 to provide the shunt circuit output voltage signal at a level that is less than the input voltage VDC. In some examples, the shunt circuit 110 operates according to the signal or signals 116 in order to control the shunt circuit voltage level at a voltage less than a rated blocking voltage of the second switching device S2. Moreover, the threshold voltage VTH in one example is less than the rated blocking voltage of the switch S2. In this manner, the IC 100 in one example ensures that the low side switching device S2 does not need to block voltages greater than 20 V, allowing the switching loss and conduction loss reductions possible by sizing S2 according to the normal operation conditions, while still allowing continued operation of the DC-DC converter 101 in combination with the shunt circuit 110 during high input voltage transient situations.

Figure 2:
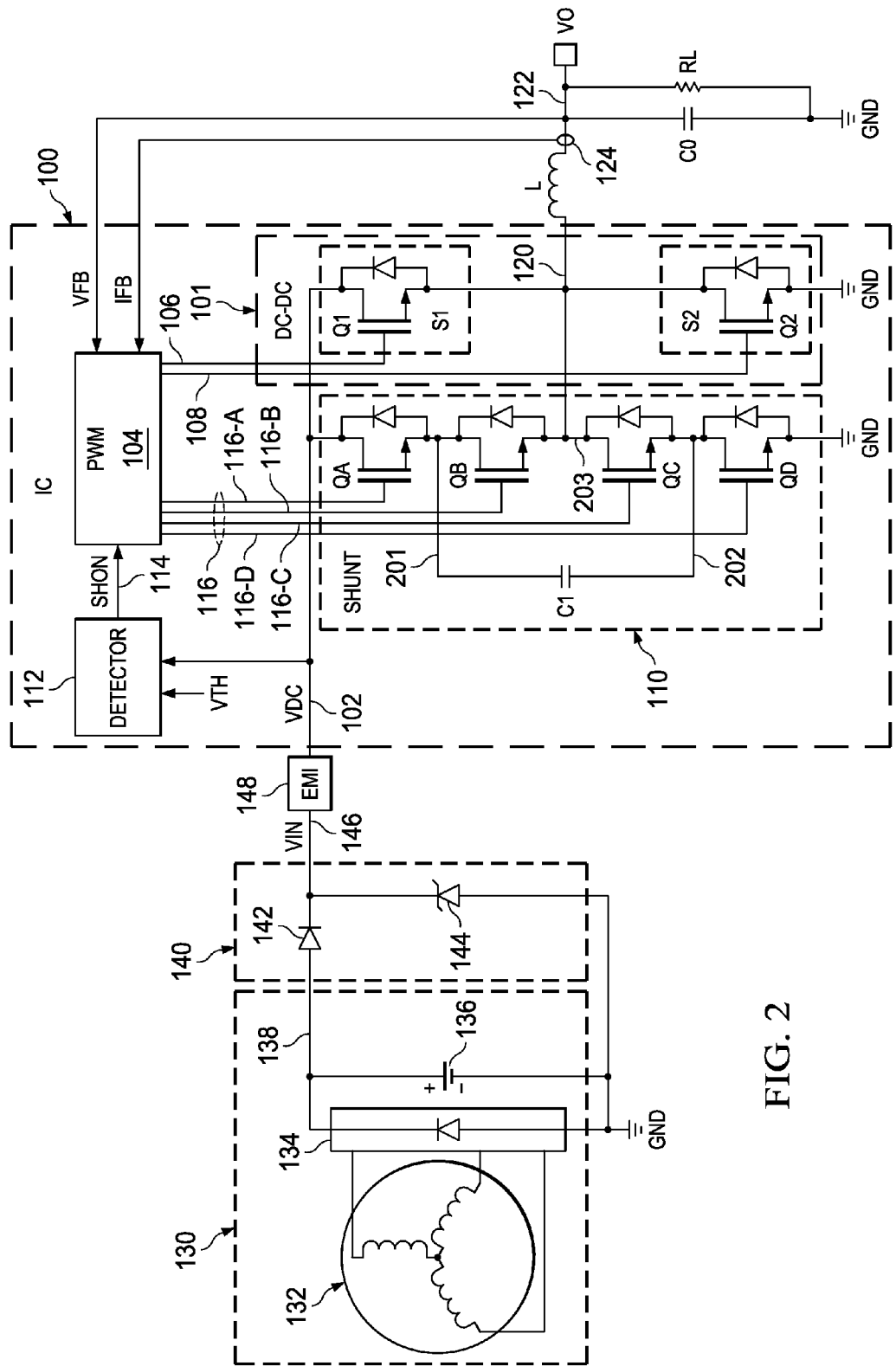
FIG. 2 is a schematic diagram of an example integrated circuit with a buck DC-DC converter and an active switched capacitor shunt circuit.
Figure 3:
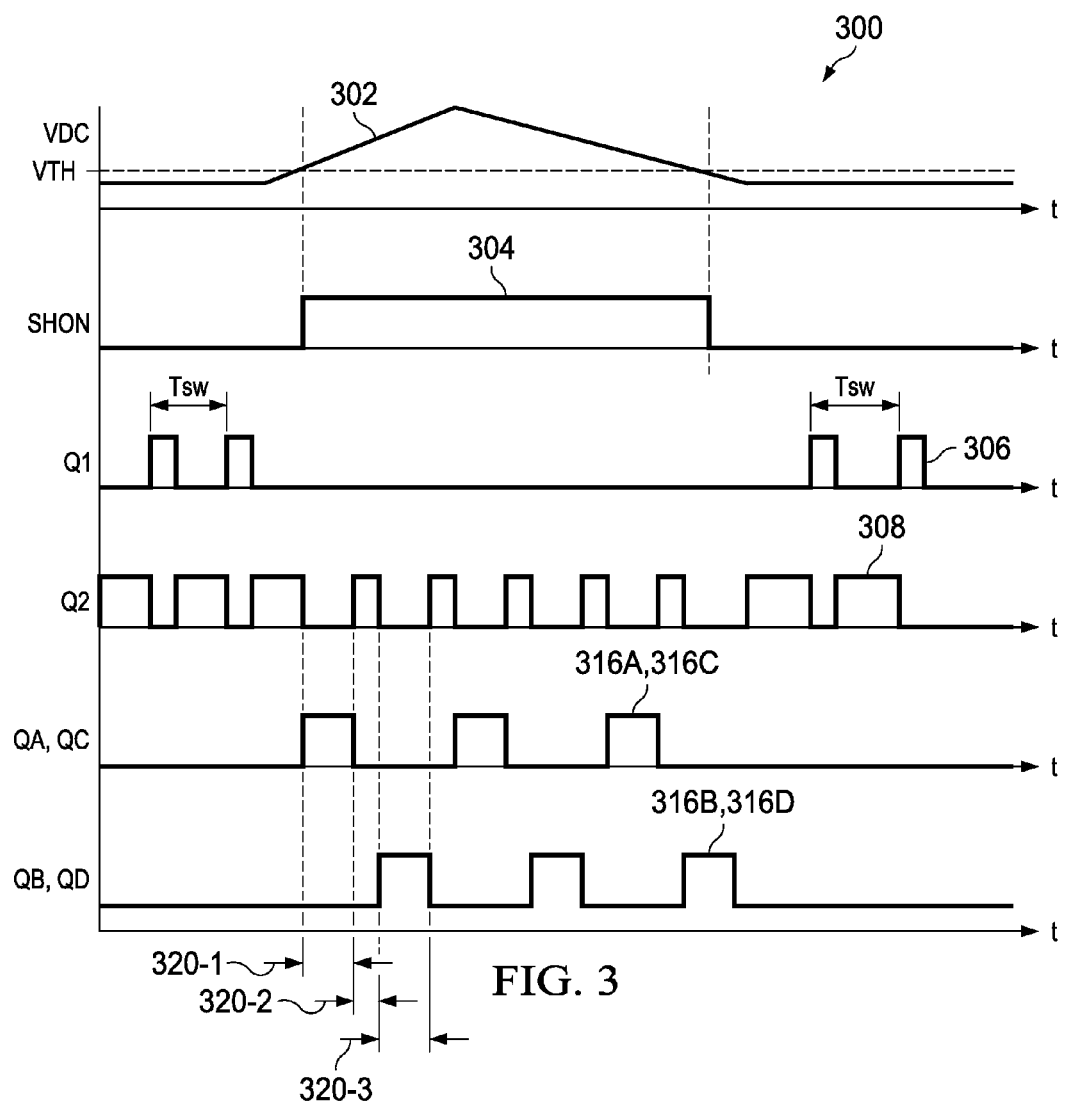
FIG. 3 is a signal diagram of signal waveforms in the integrated circuit of FIG. 2.

Referring also to FIGS. 2-8, FIG. 2 shows an example of the IC 100 with a buck DC-DC converter and an active switched capacitor shunt circuit 110, and FIG. 3 illustrates a signal diagram 300 of signal waveforms in the IC 100. In this example, the first switch S1 is an N-channel FET Q1, and the second switch S2 is an N-channel FET Q2. The shunt circuit 110 includes a first transistor QA coupled between the DC input node 102 and a first internal node 201, a second transistor QB coupled between the first internal node 201 and a shunt circuit output node 203, as well as a third transistor QC coupled between the shunt circuit output 203 and a second internal node 202, and a fourth transistor QB coupled between the node 202 and the constant voltage node GND. The shunt circuit transistors QA-QD in this example are N-channel FETs. In other examples, different shunt circuit transistor types can be used, such as N and/or P channel FETs, bipolar transistors, etc. In addition, the shunt circuit 110 in FIG. 2 includes a first capacitor C1 coupled between the first and second internal nodes 201 and 202.

The transistors QA, QB, QC and QD are operated according to corresponding first, second, third and fourth shunt circuit switching control signals 116-A, 116-B, 116-C and 116-D, respectively. In this example, the control circuit 104 provides the shunt circuit switching control signals 116 in the first mode to turn off the transistors QA-QD while providing the high and low side switching control signals 106 and 108 (curves 306 and 308, respectively, in FIG. 3) in alternating pulse width modulated (PWM) fashion at a switching frequency corresponding to a switching period Tsw to operate the switches Q1 and Q2 (S1 and S2) for converting the input voltage VDC to provide the regulated output voltage VO. As previously mentioned, the operation in the first mode can include closed loop regulation according to one or more feedback signals (e.g., VFB, IFB).

Figure 4:
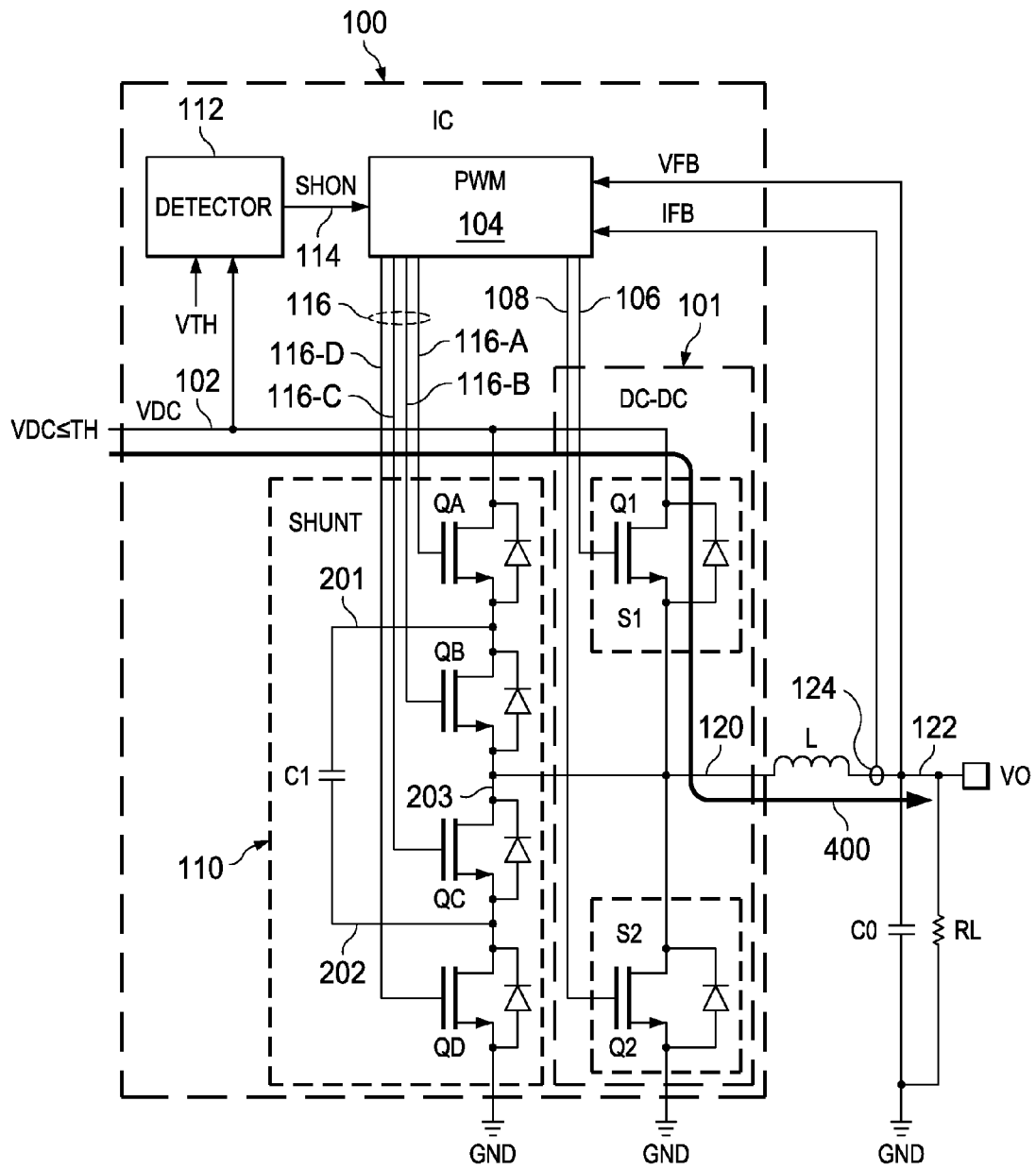
FIG. 4 is a partial schematic diagram of a high side device state in a first operating mode of the circuit of FIG. 2.
Figure 5:
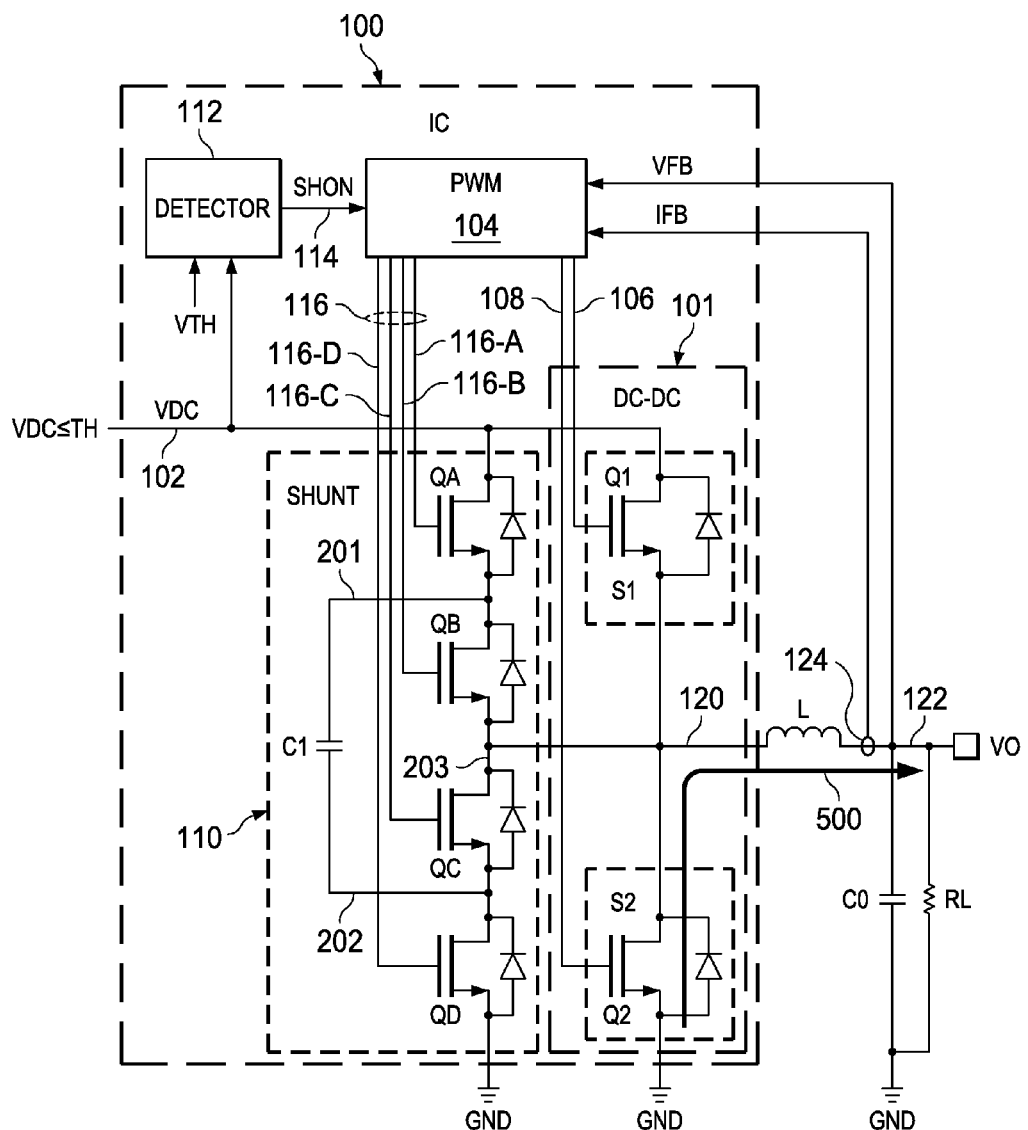
FIG. 5 is a partial schematic diagram of a low side device state in the first operating mode of the circuit of FIG. 2.

FIG. 4 shows a high side device state in the first operating mode of the circuit of FIG. 2, corresponding to normal operation with the high side switch Q1 closed (off) and the low side switch Q2 opened (on). In this condition, current flows along a path 400 from the input node 102 through Q1 and the output inductor L to the load at the output node 122. FIG. 5 shows the second normal mode condition with Q1 off and Q2 on, with the output current flowing from the constant voltage node GND through the second switch S2 and the inductor L along a path 500 to the output node 122.

During SHUNT mode operation when the input voltage VDC is above the threshold voltage VTH, the control circuit 104 provides the control signals 116 in order to deliver the shunt circuit output voltage signal at the shunt circuit output node 203 at a level less than the input voltage VDC. The diagram 300 and FIG. 3 shows an example high input voltage situation and the corresponding operation of the IC 100 of FIG. 2, where the input voltage VDC curve 302 initially operates below the threshold voltage VTH with the mode control signal curve 304 SHON initially in the first state (LO), and then VDC transitions above the threshold VTH. In response to the input voltage VDC transition above VTH, the detection circuit provides the mode control signal SHON in the second state (HI). The switching control circuit 104, in response to the mode control signal SHON, provides the shunt circuit switching control signals 116-A, 116-B, 116-C and 116-D in a repeating sequence of three phases 320-1, 320-2 and 320-3. In this example, the first and third transistors QA and QC are switched together, illustrated as curves 316A and 316C in FIG. 3, and the second and fourth transistors QB and QD are also switch together as shown by curves 316B and 316D, respectively.

Figure 6:
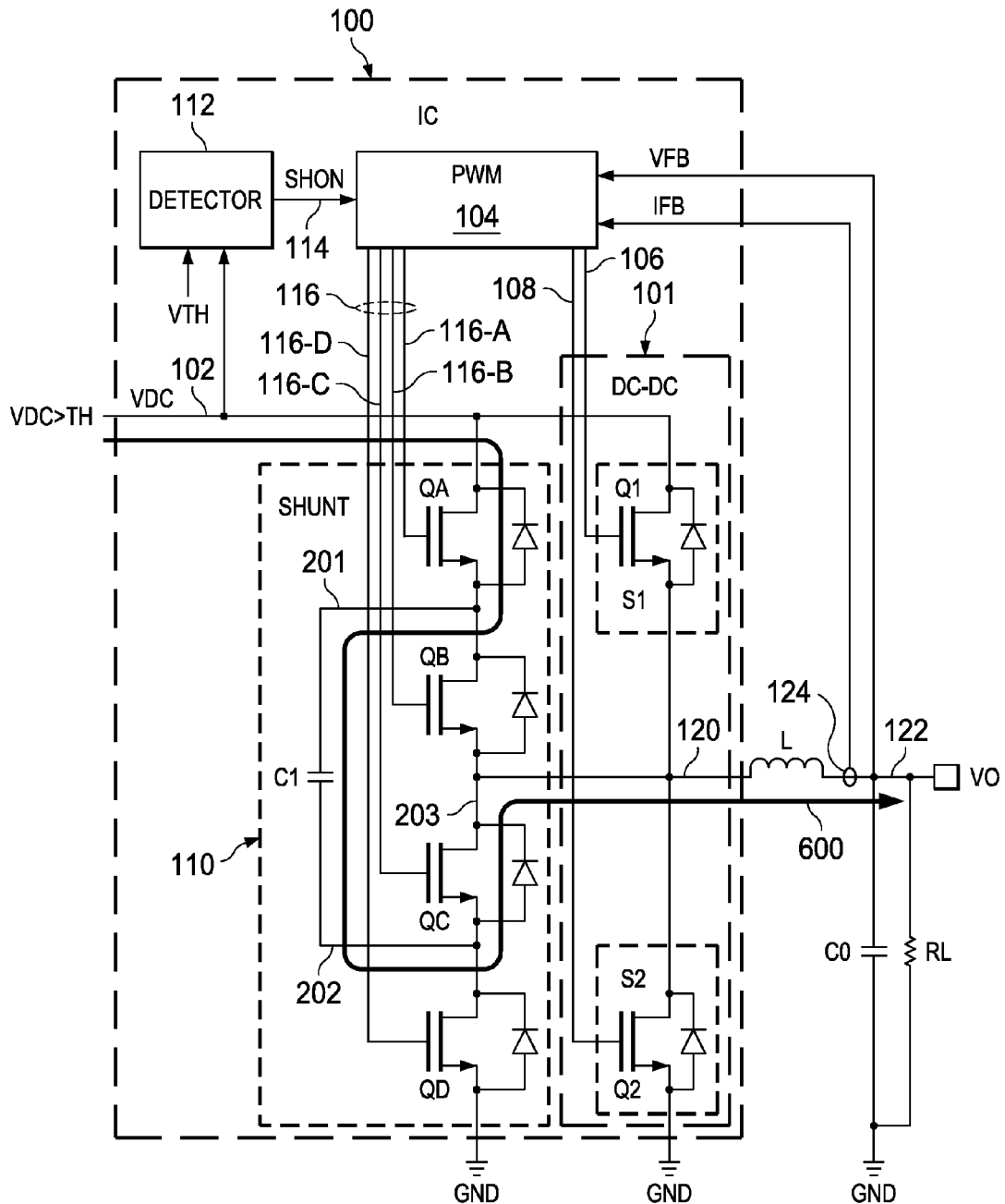
FIG. 6 is a partial schematic diagram of a first switched capacitor circuit state to charge a switched capacitor through an output inductor in a second operating mode of the circuit of FIG. 2.

Referring to FIGS. 2, 3 and 6, in the first phase 320-1 of the second mode, the switching control circuit 104 provides the control signals 116 to turn on the first and third transistors QA and QC, and to turn off QB and QD. FIG. 6 shows current flow through the shunt circuit 110 and the DC-DC converter circuit 101 during the first phase of the second mode. In this case, current flows from the input node 102 along a path 600 through QA and the capacitor C1, and continues through QC to the shunt circuit output node 203 and the switching node 120. The current flow continues through the output inductor L to the output node 122. As seen in FIG. 6, the first phase of the second mode charges the capacitor C1 through the shunt circuit output 203, using the output inductor L.

Figure 7:
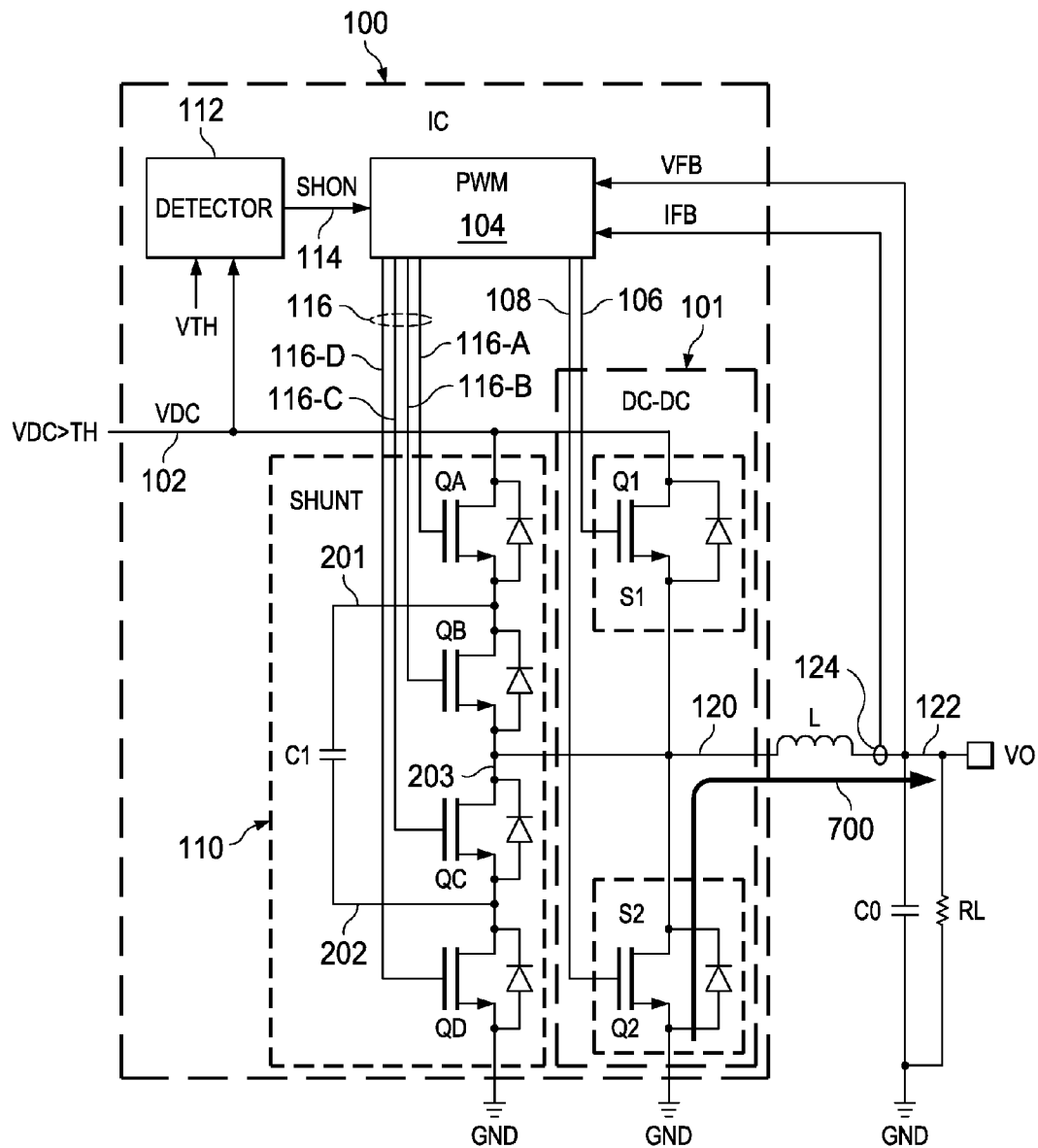
FIG. 7 is a partial schematic diagram of a second switched capacitor circuit state in the second operating mode of the circuit of FIG. 2.

In the second phase 320-2 of the second mode, the switching control circuit 104 provides the shunt circuit switching control signals 116 to turn off the transistors QA-QD of the shunt circuit 110, and provides the second switching control signal 108 to turn on Q2 (S2). As seen in FIG. 7, the output current flows along a path 700 through the second switch S2 and the output inductor L to the output node 122. In this manner, the control circuit 104 continues to use the second switch S2 as a low side DC-DC converter switch.

Figure 8:
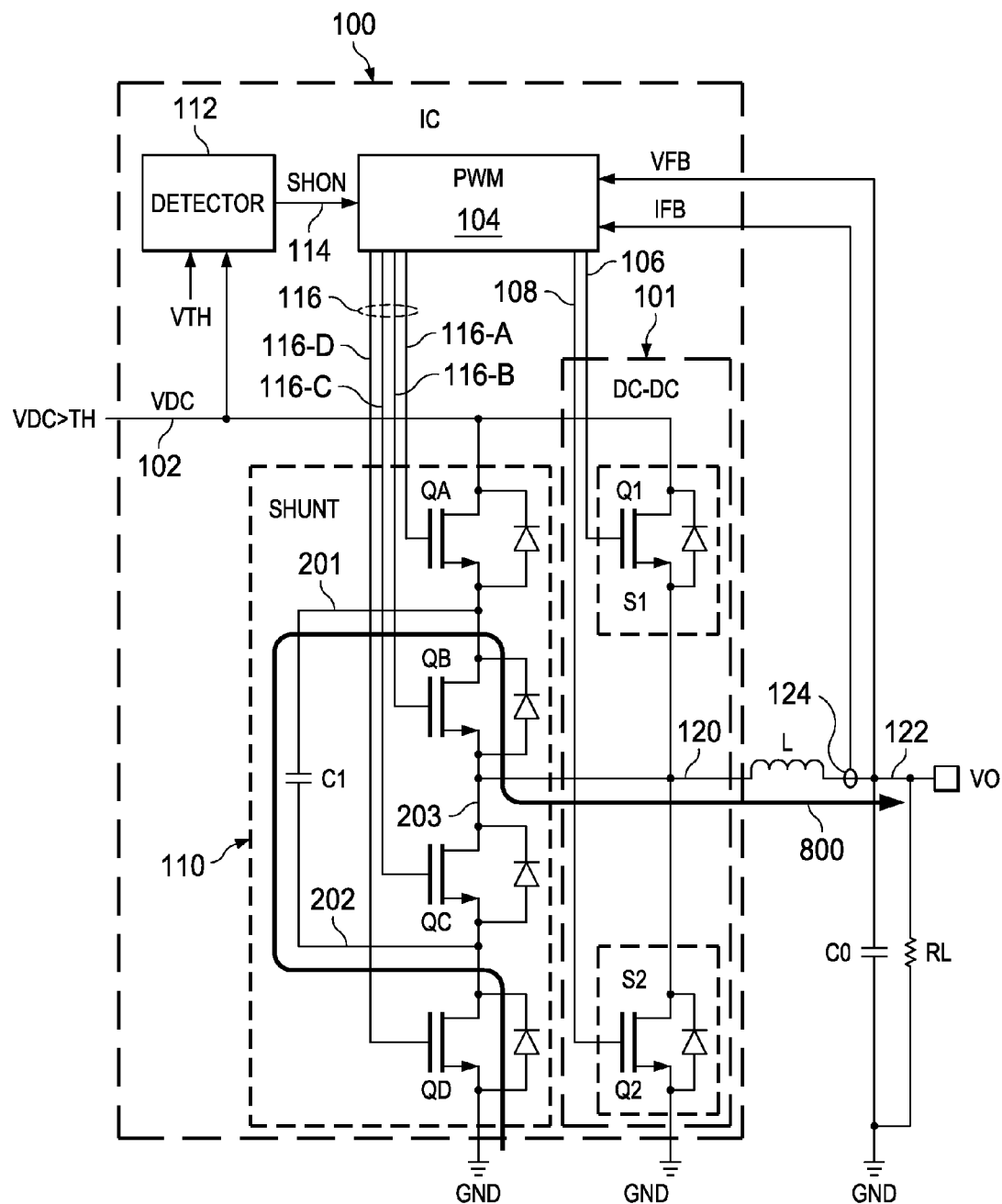
FIG. 8 is a partial schematic diagram of a third switched capacitor circuit state in the second operating mode of the circuit of FIG. 2.

Continuing in FIG. 8, in the third phase 320-3 of the second mode, the switching control circuit 104 provides the shunt circuit switching control signals 116 to turn off the first and third transistors QA and QC, and to turn on QB and QD. The capacitor C1 discharges during the third phase of the second mode through the shunt circuit output node 203 and the output inductor L, with current flowing along a path 800 from the constant voltage node GND through QD, C1, QB and the output inductor L. As seen in FIGS. 6 and 8, the shunt circuit example 110 uses the output inductor L for both charging and discharging the shunt circuit capacitor C1. Moreover, the circuit operation in FIGS. 6-8 illustrates the high and low side switching functions of the buck converter system implemented using the shunt circuit 110 and the second switching device S2 while the primary high side switching device S1 is turned off during high input voltage transient situations in the second mode. Thus, the IC 100 provides continued DC-DC circuit operation to control the output voltage VO provided to the load RL even when the input voltage VDC is above the threshold voltage VTH, and allows use of a properly sized low side switching device S2 for high efficiency operation during the first (NORMAL) operating mode (e.g., FIGS. 4 and 5).

Figure 9:
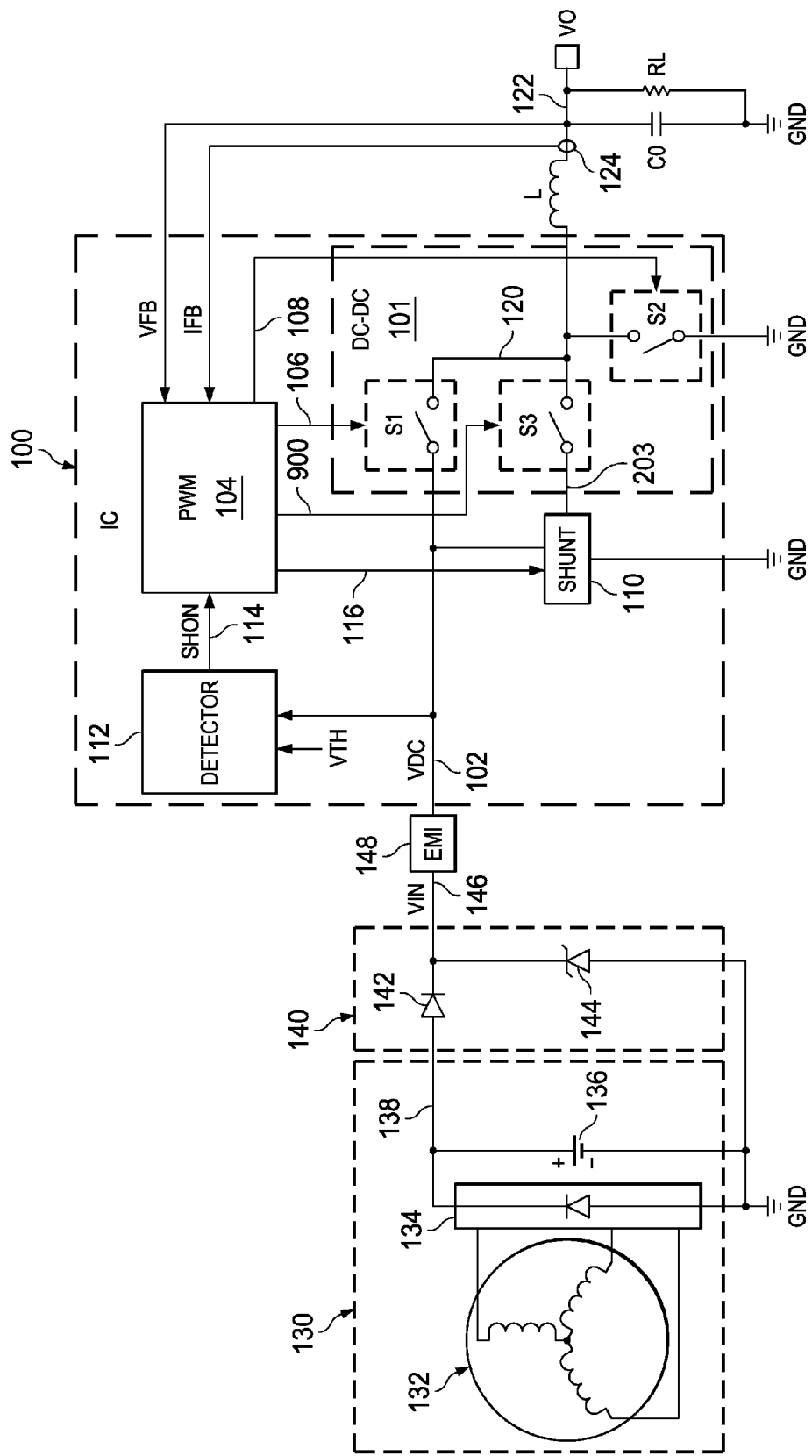
FIG. 9 is a schematic diagram of a second example integrated circuit including an active shunt circuit to accommodate high input voltage transients.

FIG. 9 shows a second example IC 100 including an active shunt circuit 110 to accommodate high input voltage transients in the power conversion system. In this example, the IC 100 includes a third switching device S3 coupled between the shunt circuit output node 203 and the switching node 122 operate as a high side buck converter switch during operation in the second (SHUNT) mode when the input voltage VDC exceeds the threshold voltage VTH. The third switch S3 can be any suitable transistor switch, such as an N-channel FET, operative according to a third switching control signal 900 from the control circuit 104. In this example, the switching control circuit 104 provides the third switching control signal 900 in the first mode (NORMAL) to turn off S3. This allows normal buck converter operation using the first and second switching devices S1 and S2 according to pulse width modulated switching control signals 106 and 108 from the control circuit 104. In the second mode (SHUNT) the control circuit 104 provides the second and third switching control signals 108 and 900, respectively, to control the output voltage signal VO, with the third switch S3 operating in this example as a high side buck converter switch, and S2 operating as a low side buck converter switch. As seen in FIG. 9, the shunt circuit 110 provides the input voltage to this adapted buck converter configuration at the shunt circuit output node 203 at a voltage less than the elevated input voltage VDC (e.g., VDC/2 in one example). Any suitable second supply circuit 110 can be used, such as an active shunt circuit including one or more transistors and one or more capacitors.

Figure 10:
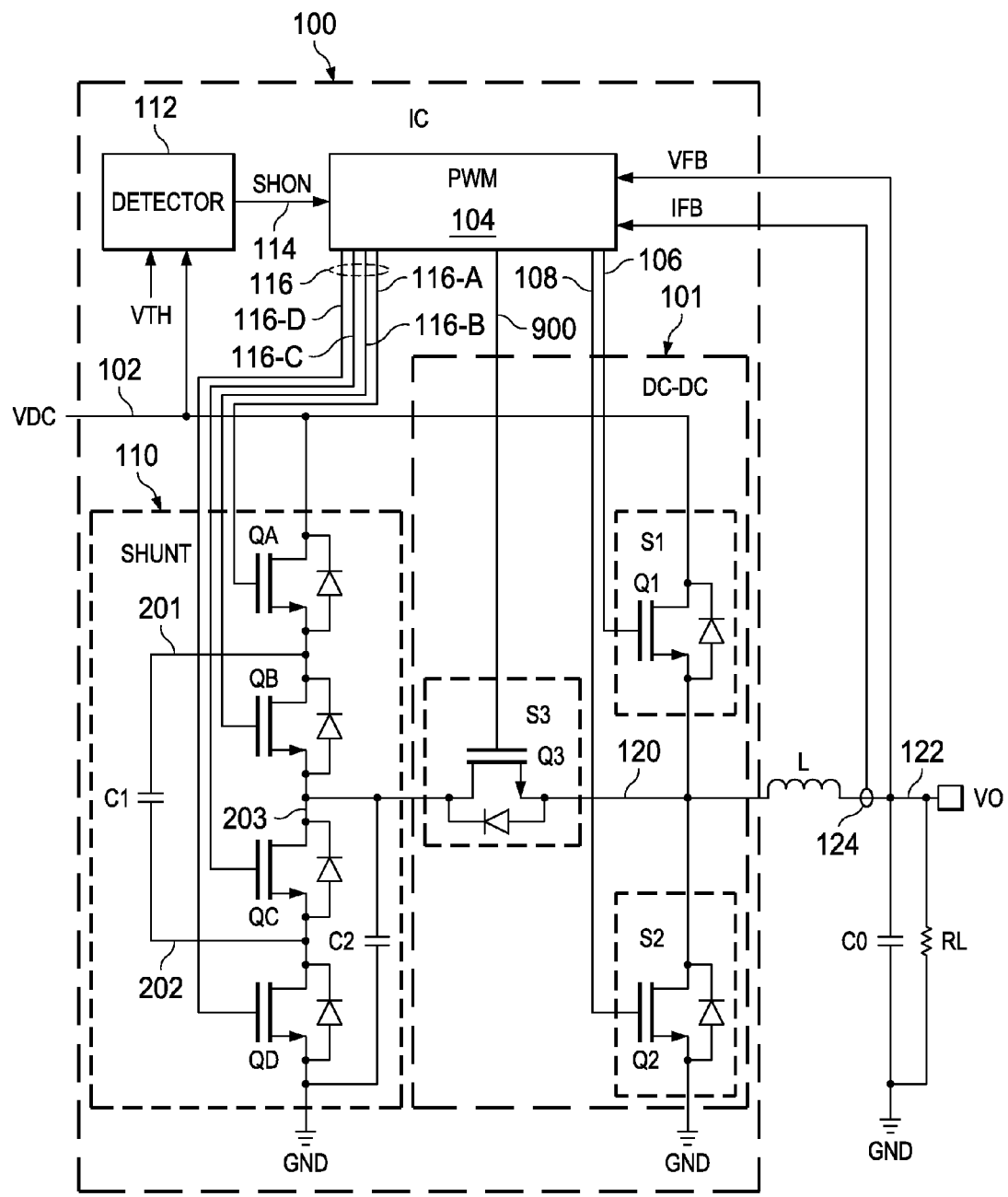
FIG. 10 is a schematic diagram of an example integrated circuit with a buck DC-DC converter and a three-level active switched capacitor shunt circuit.

FIG. 10 shows an example IC 100 with a buck DC-DC converter including a third switching device S3, in this case an N-channel FET Q3. In addition, the example of FIG. 10 includes a three-level active switched capacitor shunt circuit 110, which includes a second capacitors C2 coupled between the shunt circuit output node 203 and the constant voltage node GND. In this example, the shunt circuit 110 includes transistors QA-QD and a first capacitor C1 as described above. In addition, the control circuit 104 in one example separately operates S3 and S2 ring the second mode to regulate the output voltage signal VO using pulse width modulated control signals 900 and 108, respectively, while separately providing the control signals 116 to the shunt circuit 110 in order to control the shunt circuit output voltage at the node 203.

Figure 11:
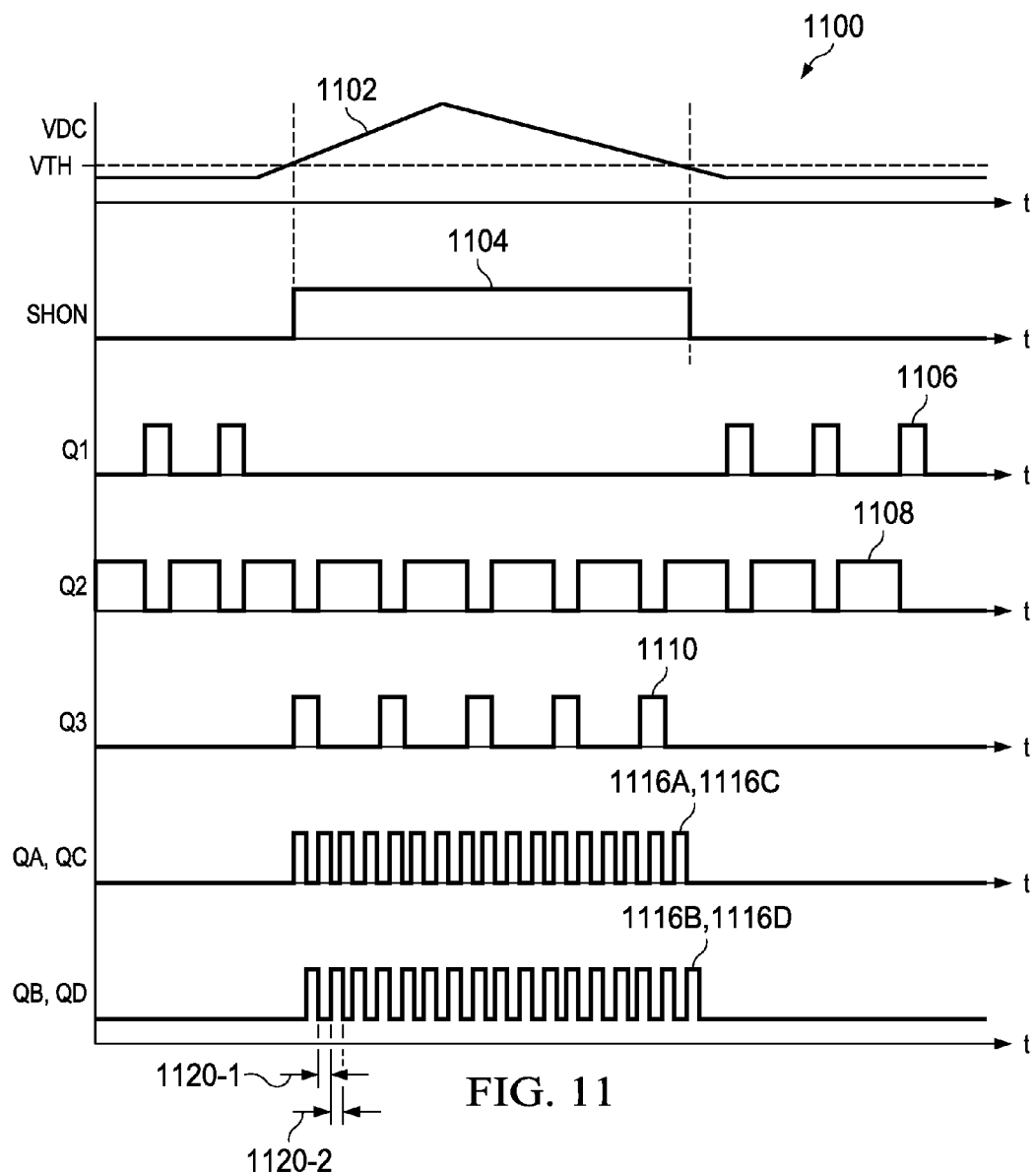
FIG. 11 is a signal diagram of signal waveforms in the integrated circuit of FIG. 10.

FIG. 11 shows a signal diagram 1100 of signal waveforms in the integrated circuit of FIG. 10 for another example situation in which the input voltage VDC (curve 1102) initially operates in the normal range, and then transitions above the threshold voltage VTH. Initially, the mode control signal SHON (curve 1104) is LO and the control circuit 104 provides the pulse width modulated switching control signals 106 and 108 (curves 1106 and 1108, respectively, and FIG. 11) to operate the first and second switches Q1 and Q2.

Then the detector circuit 112 transitions the signal SHON to the second state (HI) when the input voltage VDC exceeds VTH. In the second mode, the control circuit 104 turns off Q1 (S1), and continues to provide pulse width modulated switching control signal 108 to the second switch Q2 (S2), and provides pulse width modulated regulation of the output voltage VO by also providing the third switching control signal 900 to Q3 (S3) (curve 1110 in FIG. 11). In addition, the switching control circuit 104 provides the shunt circuit switching control signals 116 in the second mode in a repeating sequence of a first phase 1120-1 and a second phase 1120-2, as shown in FIG. 11. In the first phase 1120-1, the control circuit 104 provides the signals 116 to turn on the first and third transistors QA and QC (curves 1116A and 1116C) and to turn off QB and QD to charge the capacitor C1 through the shunt circuit output node 203. In the second phase of the second mode in this example, the control circuit 104 provides the signals 116 to turn off the transistors QA and QC, and to turn on QB and QD (curves 1116B and 1116D) two discharge C1 through the shunt circuit output 203. In one example, the shunt circuit signal voltage at nodes 203 is regulated according to one or more feedback signals (not shown) provided to the control circuit 104. In other examples, the control circuit 104 provides the control signals 116 in the second mode according to a fixed duty cycle (e.g., 50%) in open loop fashion to provide a voltage across C2 at the shunt circuit output node 203 for use by the reconfigured high and low side buck converter switches S3 and S2 without shunt circuit feedback control.

Figure 12:
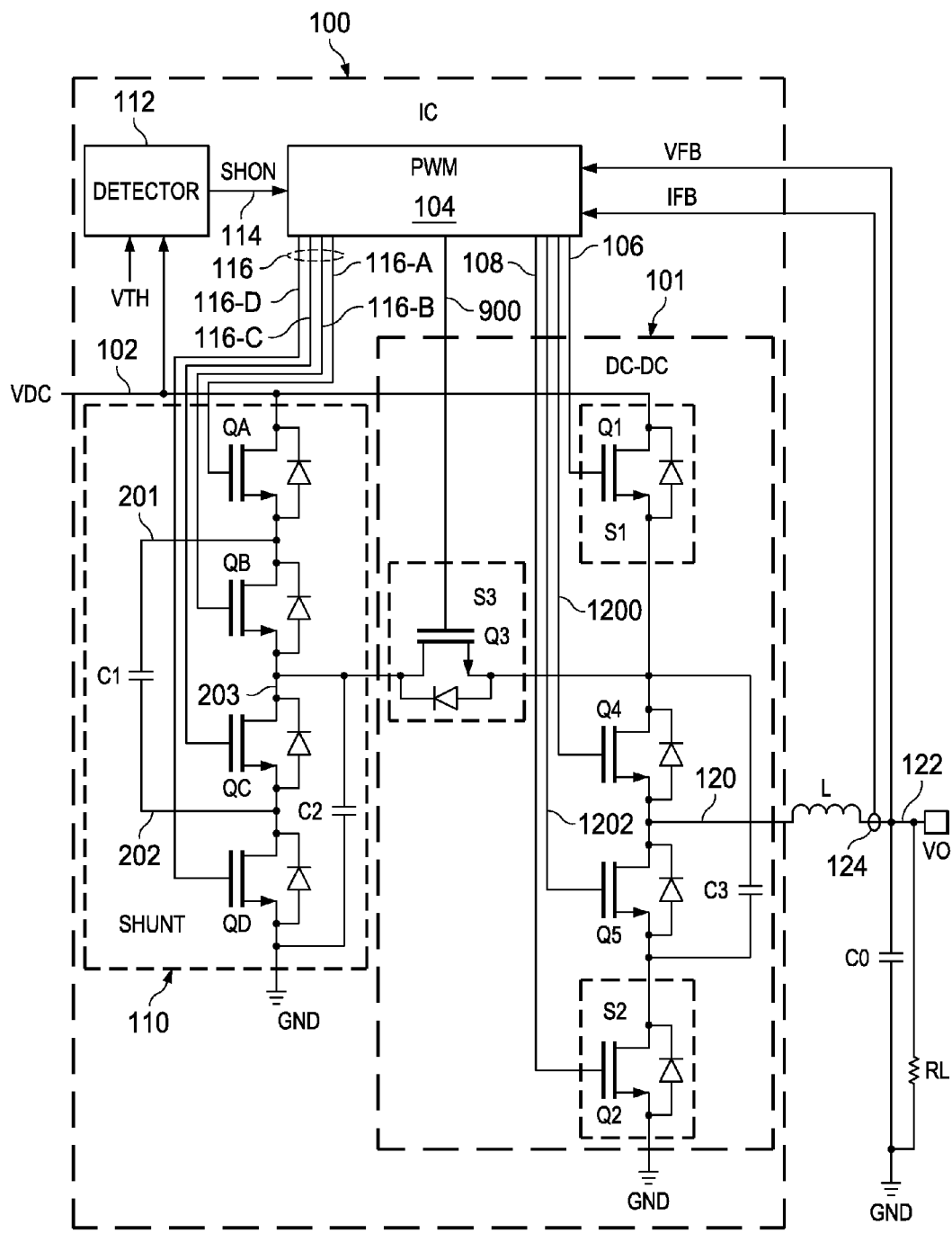
FIG. 12 is a schematic diagram of a third example integrated circuit with a three level DC-DC converter.

FIG. 12 shows a third example integrated circuit 100 with an active shunt circuit 110 having transistors QA-QD and capacitors C1 and C2 as described above. In addition, this example includes a three level DC-DC converter circuit 101. The DC-DC converter circuit 101 in this example includes transistors Q4 and Q5 connected between the first switching device S1 and the second switching device S2. The switching node 120 is connected between Q4 and Q5, and the third switch S3 is connected between the shunt circuit output node 203 and the node joining Q1 and Q4. In addition, the DC-DC circuit 101 in this example includes a third capacitor C3 connected between the node joining Q1, Q3 and Q4, and the node joining Q5 and Q2. The control circuit 104 in this example provides fourth and fifth switching control signals 1200 and 1202 to Q4 and Q5, respectively, to operate the circuit 101 as a three level converter in the first mode in order to regulate the output voltage signal VO by changing the switching states of Q1, Q2, Q4 and Q5 while Q3 is turned off via the signal 900. In the second mode, Q1 is turned off, and the control circuit 104 operates Q2-Q5 to regulate the output voltage signal VO, while separately providing the shunt circuit switch control signals 116 to operate the transistors QA-QD of the shunt circuit 110 to control the shunt circuit output voltage at the node 203.

Figure 13:
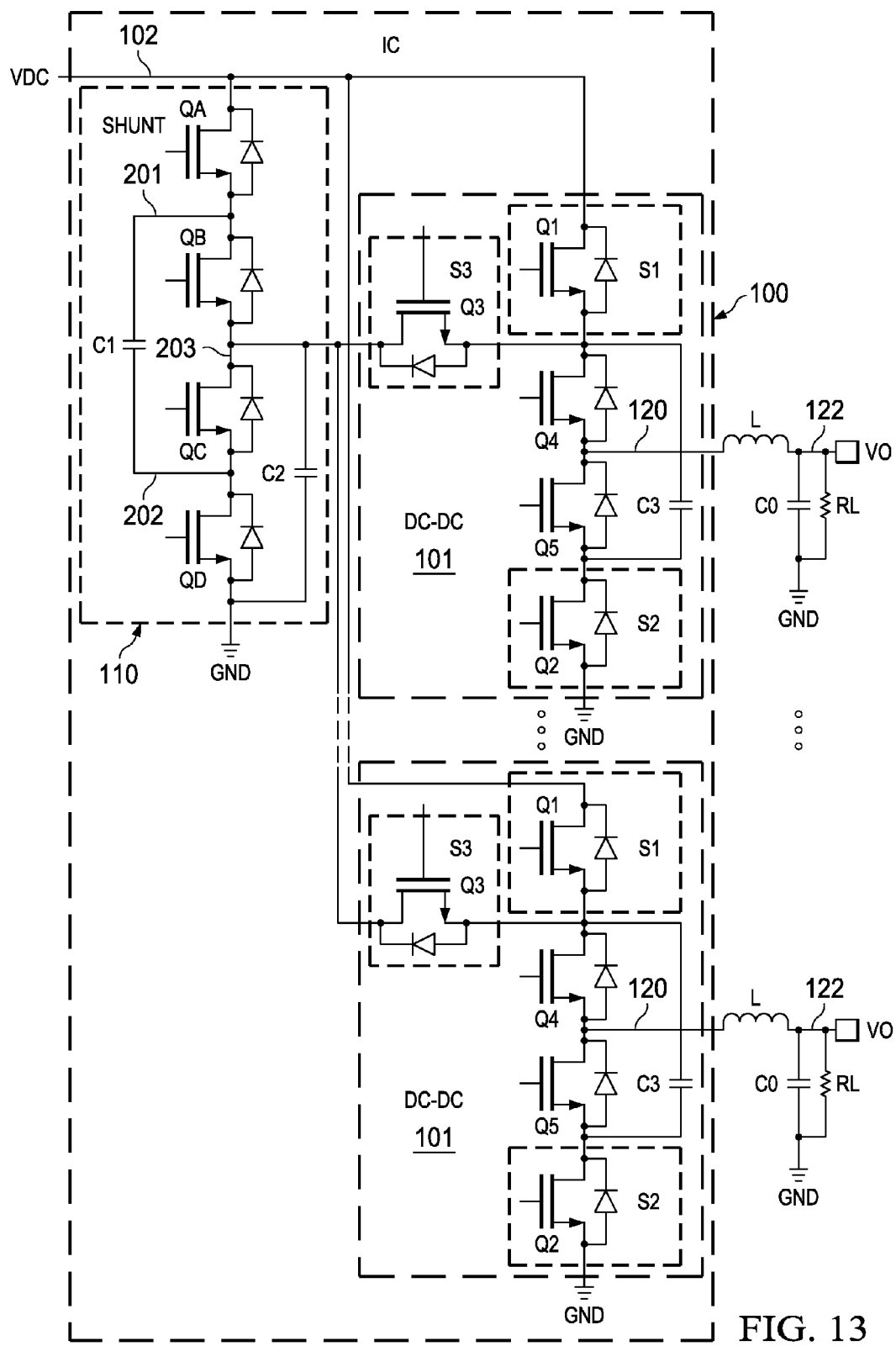
FIG. 13 is a schematic diagram of another example integrated circuit with multiple DC-DC converter circuits and a single active shunt circuit.

FIG. 13 illustrates another to the next two words yet another example IC 100 including multiple DC-DC converter circuits 101 operating generally as described above, using a shared active shunt circuit 110. In this case, the individual DC-DC circuits 101 are connected to the input node 102 in order to receive the input voltage VDC, with first switching devices S1 operating as high side switches during normal operation. In the second mode (SHUNT mode), the S1 switches are turned off, and the individual S3 switches of the DC-DC converter stages 101 are operated along with the single shunt circuit 110 by the control circuit 104 to provide continued DC-DC conversion operation during high input voltage transient conditions. Like the above examples, moreover, the low side switching devices as to can be sized according to the normal operating voltage ranges (e.g., 20 V blocking capability), thereby facilitating high efficiency operation during normal mode, with the capability of withstanding transient conditions while continuing to provide DC-DC converter output signals VO.

Figure 14:
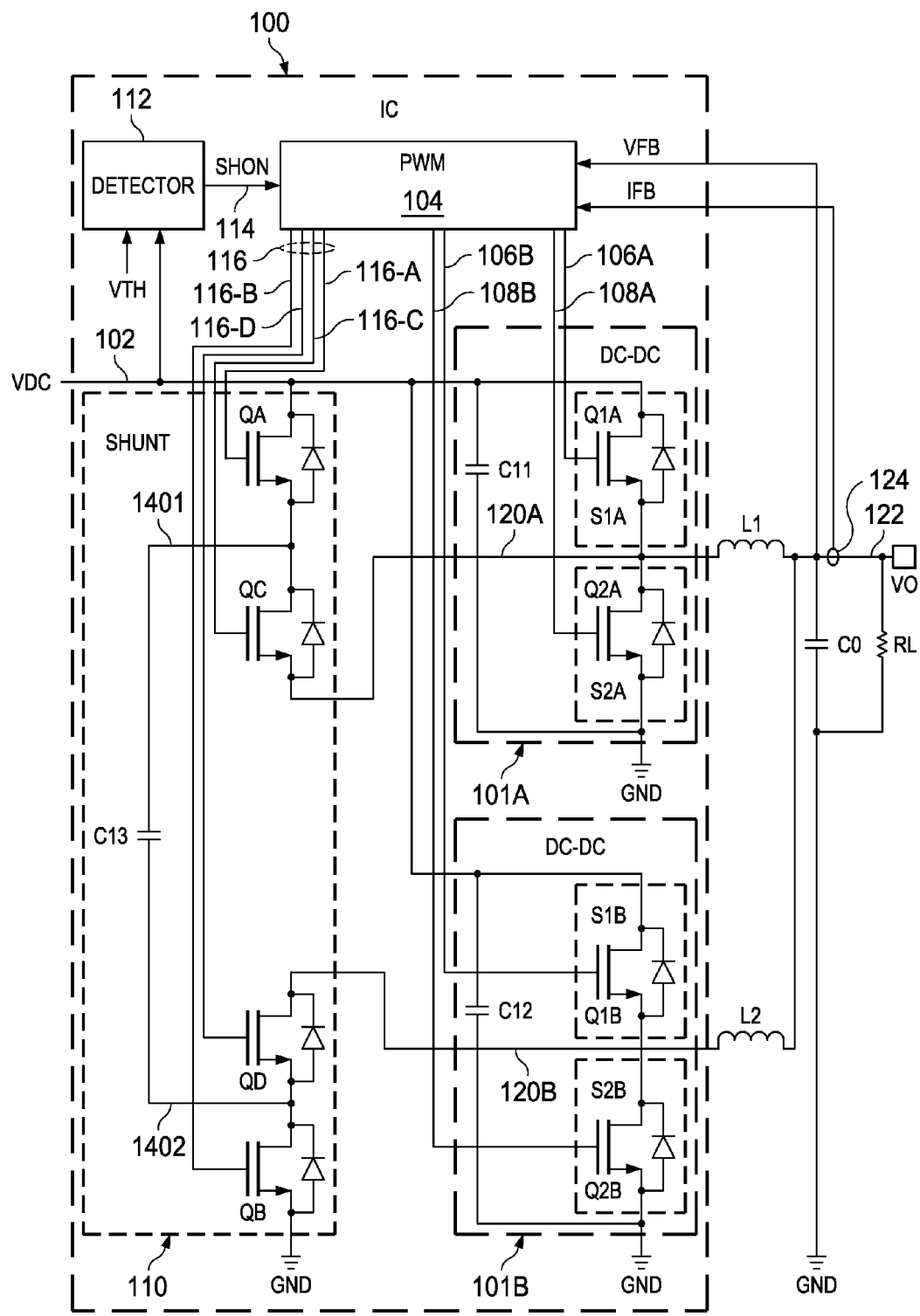
FIG. 14 is a schematic diagram of another example integrated circuit with a dual phase DC-DC converter circuit and an active shunt circuit.
Figure 15:
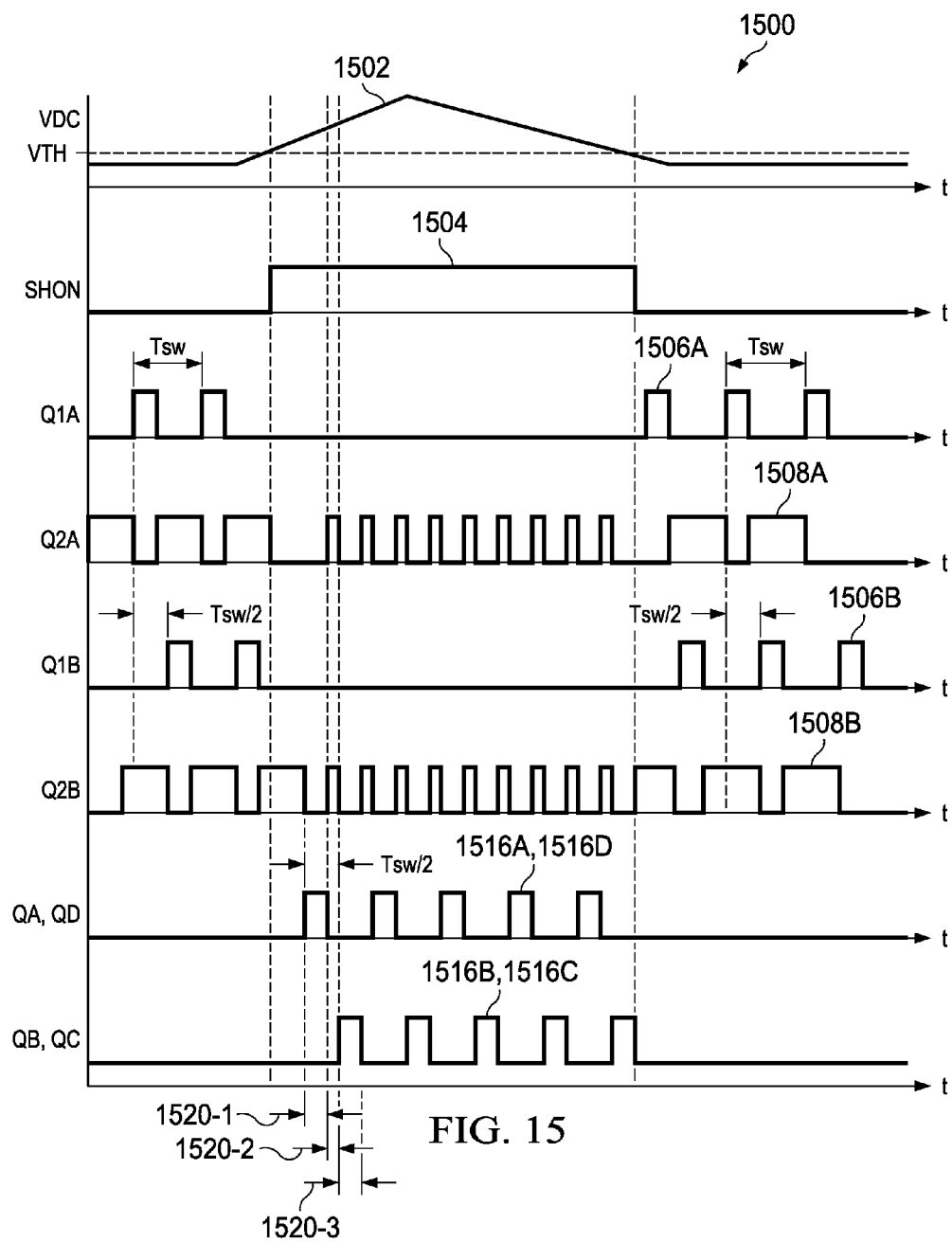
FIG. 15 is a diagram of signal waveforms in the integrated circuit of FIG. 14.

Referring now to FIGS. 14 and 15, FIG. 14 shows another example integrated circuit 100 that includes an active shunt circuit to operate a dual phase DC-DC converter formed by first and second DC-DC converter circuits 101A and 101B, two output inductors L1 and L2 and an active shunt circuit 110. The individual DC-DC converter circuits 101A and 101B are operated in one example in phase shifted relationship with respect to one another (e.g., 180°), and include corresponding capacitors C11 and C12, respectively connected across the corresponding pair of series connected transistors between the input voltage VDC and the constant voltage node GND. A center node 120A joining the first and second switches S1A and S1B of the first converter circuit 101A is connected to a first end of the first inductor L1, and the second end of L1 is connected to the output node 122. Similarly, a center node 120B joining switches S2A and S2B of the second converter circuit 101B is connected to a first end of L2, and the second end of L2 is connected to the output node 122.

The active shunt circuit 110 in this example includes a transistor QA connected between VDC (node 102) and a first internal node 1401, and a transistor QC connected between the node 1401 and a node 120A. In addition, the shunt circuit 110 includes a transistor Q2 the connected between a node 120B and a second internal node 1402, and a transistor QB connected between the node 1402 and the constant voltage node GND. The shunt circuit 110 also includes a floating or flying capacitor C-13 connected between the nodes 1401 and 1402. The control circuit 104 provides control signals 116 to operate the transistors QA-QD of the shunt circuit 110, including a signal 116-A to operate the transistor QA (curve 1516A in FIG. 15), a signal 116-B to operate QB (curve 1516B), a signal 116-C to operate QC (curve 1516B) and a signal 116-D to operate QD (1516D in FIG. 5). As shown in FIGS. 14 and 15, the IC 100 provides high input voltage transient protection along with efficient normal mode operation as in the above examples, in the context of a multiphase converter, in this case a dual phase buck converter. Alternative multiphase examples are possible using other forms of DC-DC conversion to biology (e.g., boost, buck-boost, cuk, etc.). Moreover, the example of FIGS. 14 and 15 includes the same total number of switches as the single phase example of FIG. 2 above, with the active shunt circuit switches QA-QD and the floating capacitor C13 shared between the first and second DC-DC converter circuits 101A and 101B. Multiphase examples can be used in a variety of applications, including situations where a single stage solution needs to support a higher current range (e.g., 10 A), and multiphase solutions provide the opportunity for high efficiency across varying load conditions. Moreover, such multiphase solutions facilitate the use of smaller output and EMI filters and components thereof, and certain examples (e.g., FIG. 15) provide a symmetric two phase solution. In addition, the flying or floating capacitor C13 can be automatically balanced by a current sharing loop between the upper and lower converter stages 101A and 101B. Moreover, a common bootstrap capacitor (not shown) can be used to drive the transistors QC and QD.

FIG. 15 shows a diagram 1500 illustrating the signal waveforms in the IC 100 of FIG. 14 for an example situation in which the input voltage VDC (curve 1502) initially operates in the normal range, and then transitions above the threshold voltage VTH. Initially, the mode control signal SHON (curve 1504) is LO and the control circuit 104 provides a PWM switching control signals 106A and 106B to operate the first switches S1A (transistor Q1A) and S1B (transistor Q21B) of the respective first and second converter circuits 101A and 101B, shown as curves 1506A and 1506B in FIG. 15. In addition, the control circuit 104 also provides signals 108A and 108B to the switches S2A (Q2A) and S2B (Q2B), shown as curves 1508A and 1508B, in the first mode for pulse width modulated regulation of the output voltage VO presented to the load RL at the output node 122 at a switching frequency corresponding to a switching period Tsw. In this first or normal mode, the control circuit 104 regulates the output voltage VO according to one or more feedback control signals VFB and/or IFB from the sensor 124 as described above. Moreover, the control circuit 104 operates the dual phase converter by providing the switching control signals 106A and 108A phase shifted by 180° relative to the switching control signals 106B and 108B as shown in FIG. 15.

In the second mode (SHUNT mode) when the mode control signal SHON goes high responsive to detection that the input voltage VDC exceeds the threshold VTH, the switching frequency remains the same and the control circuit 104 turns off the transistors Q1A and Q1B (signals 106A and 106B go LO). In addition, the control circuit 104 provides the signals 108A and 108B contemporaneously to provide low side inverter switching operation in alternating fashion with switched operation of an alternating pair or set of two of the shunt circuit transistors QA-QD. In particular, as shown in FIG. 15, the control circuit 104 in one example in the second operating mode turns on QA and QD together for a first portion of a converter cycle 1520-1, and then turns on Q2A and Q2B during a second portion 1520-2. For the next cycle, the control circuit turns on QB and QC during a third portion 1520-3, and then again turns on Q2Aa and Q2B to the next cycle. During this SHUNT mode operation, the switching node voltages are VDC minus the voltage across the capacitor C13, and controlling the capacitor charging and discharging times to be approximately equal, the voltage across C13 is approximately VDC/2. This switching pattern repeats as shown in FIG. 15 to continue to provide a DC output voltage VO at the output node 122, and the floating capacitor C13 is charged and discharged through the output inductors L1 and L2. In one example, the DC-DC conversion operation in the second mode is performed an open loop manner under control of the control circuit 104. In other examples, the control circuit 104 provides the switching control signals 106, 108 and 116 in the second mode at least partially according to one or more feedback signals for closed loop regulation of the output voltage VO. Continuing in the example of FIG. 15, once the high input voltage transient condition ends (VDC falls below VTH), the SHON signal again goes LO, and the control circuit 104 turns off the shunt circuit transistors QA-QD to resume normal mode PWM operation of the switches S1A, S2A, S1B and S2B. In certain embodiments, the output inductors L1 and L2 are separate devices. In other examples, coupled inductors can be used, such as L1 and L2 being formed as separate windings on a common or shared inductor core (not shown).

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. An integrated circuit, comprising:
a DC-DC converter circuit to control an output voltage signal, the DC-DC converter circuit including:
  a first switching device coupled between a DC input node and a switching node, the first switching device operative according to a first switching control signal, and
  a second switching device coupled between the switching node and a constant voltage node, the second switching device operative according to a second switching control signal;
an active shunt circuit including a shunt circuit input coupled to the DC input node, and a shunt circuit output, the active shunt circuit operative according to a shunt circuit switching control signal to provide a shunt circuit output voltage signal to the shunt circuit output at a shunt circuit voltage level less than the input voltage; and
a detector circuit including an input coupled to the DC input node, and an output to provide a mode control signal in a first state when an input voltage of the DC input node is less than a threshold voltage, the output operative to provide the mode control signal in a different second state when the input voltage of the DC input node is greater than the threshold voltage;
a switching control circuit operative in a first mode when the mode control signal is in the first state to provide the first and second switching control signals to operate the first and second switching devices to regulate the output voltage signal according to a feedback signal, the switching control circuit operative in a second mode when the mode control signal is in the second state to provide the first switching control signal to turn off the first switching device, and to provide the second switching control signal and the shunt circuit switching control signal to operate the active shunt circuit and the second switching device to control the output voltage signal.

2. The integrated circuit of claim 1, wherein the switching control circuit is operative in the second mode to provide the shunt circuit switching control signal to control the shunt circuit voltage level at approximately half the input voltage.

3. The integrated circuit of claim 1, wherein the switching control circuit is operative in the second mode to provide the shunt circuit switching control signal to control the shunt circuit voltage level at a voltage less than a rated blocking voltage of the second switching device.

4. The integrated circuit of claim 3, wherein the threshold voltage is less than a rated blocking voltage of the second switching device.

5. The integrated circuit of claim 1, wherein the threshold voltage is less than a rated blocking voltage of the second switching device.

6. The integrated circuit of claim 1,
wherein the active shunt circuit includes:
  a first transistor coupled between the DC input node and a first internal node, the first transistor operative according to a first shunt circuit switching control signal,
  a second transistor coupled between the first internal node and the shunt circuit output, the second transistor operative according to a second shunt circuit switching control signal,
  a third transistor coupled between the shunt circuit output and a second internal node, the third transistor operative according to a third shunt circuit switching control signal,
  a fourth transistor coupled between the second internal node and the constant voltage node, the fourth transistor operative according to a fourth shunt circuit switching control signal, and
  a capacitor coupled between the first and second internal nodes; and
wherein the switching control circuit is operative in the first mode to provide the shunt circuit switching control signals to turn off the first, second, third and fourth transistors, and wherein the switching control circuit is operative in the second mode to provide the shunt circuit switching control signals to provide the shunt circuit output voltage signal at the shunt circuit output at the shunt circuit voltage level less than the input voltage.

7. The integrated circuit of claim 6,
wherein the switching control circuit is operative in the second mode to provide the shunt circuit switching control signals in a repeating sequence of a first phase, a second phase, and a third phase;
wherein the switching control circuit provides the shunt circuit switching control signals in the first phase to turn on the first and third transistors and turn off the second and fourth transistors to charge the capacitor through the shunt circuit output;
wherein the switching control circuit provides the shunt circuit switching control signals in the second phase to turn off the first, second, third and fourth transistors; and
wherein the switching control circuit provides the shunt circuit switching control signals in the third phase to turn off the first and third transistors and turn on the second and fourth transistors to discharge the capacitor through the shunt circuit output.

8. The integrated circuit of claim 6, further comprising a third switching device coupled between the shunt circuit output and the switching node, the third switching device operative according to a third switching control signal;
wherein the switching control circuit is operative in the first mode to provide the third switching control signal to turn off the third switching device; and
wherein the switching control circuit is operative in the second mode to provide the second and third switching control signals to control the output voltage signal.

9. The integrated circuit of claim 8, wherein the active shunt circuit includes a second capacitor coupled between the shunt circuit output and the constant voltage node.

10. The integrated circuit of claim 8,
wherein the switching control circuit is operative in the second mode to provide the shunt circuit switching control signals in a repeating sequence of a first phase and a second phase;
wherein the switching control circuit provides the shunt circuit switching control signals in the first phase to turn on the first and third transistors and turn off the second and fourth transistors to charge the capacitor through the shunt circuit output; and wherein the switching control circuit provides the shunt circuit switching control signals in the second phase to turn off the first and third transistors and turn on the second and fourth transistors to discharge the capacitor through the shunt circuit output.

11. The integrated circuit of claim 10, wherein the switching control circuit is operative in the second mode to provide the second and third switching control signals as alternating pulse width modulated signals to control the output voltage signal.

12. The integrated circuit of claim 1, wherein the DC-DC converter circuit is a buck converter to control the output voltage signal.

13. The integrated circuit of claim 1, wherein the DC-DC converter circuit is a three level converter.

14. The integrated circuit of claim 1, further comprising a second DC-DC converter circuit to control a second output voltage signal, the second DC-DC converter circuit including:
a third switching device coupled between a DC input node and a switching node, the first switching device operative according to a first switching control signal, and
a second switching device coupled between the switching node and a constant voltage node, the second switching device operative according to a second switching control signal.

15. The integrated circuit of claim 1, further comprising a second DC-DC converter circuit to control the output voltage signal, the second DC-DC converter circuit including:
a third switching device coupled between the DC input node and a second switching node, the third switching device operative according to a third switching control signal from the switching control circuit, and
a fourth switching device coupled between the second switching node and the constant voltage node, the fourth switching device operative according to a fourth switching control signal;
wherein the switching control circuit is operative in the first mode to provide the first, second, third and fourth switching control signals to operate the first, second, third and fourth switching devices to regulate the output voltage signal according to the feedback signal; and
wherein the switching control circuit is operative in the second mode to provide the first switching control signal to turn off the first switching device, to provide the third switching control signal to turn off the third switching device, and to provide the second switching control signal, the fourth switching control signal and the shunt circuit switching control signal to operate the active shunt circuit, the second switching device, and the fourth switching device to control the output voltage signal.

16. A power conversion system, comprising:
a DC-DC converter circuit, including:
a DC input node to receive a DC input voltage;
an output node to provide an output voltage signal;
a first switching device coupled between the DC input node and the switching node, the first switching device operative according to a first switching control signal, and
a second switching device coupled between the switching node and a constant voltage node, the second switching device operative according to a second switching control signal;
a switching control circuit operative in a first mode when the DC input voltage is less than a threshold voltage to provide the first and second switching control signals to operate the first and second switching devices to regulate the output voltage signal, the switching control circuit operative in a second mode when the DC input voltage is greater than the threshold voltage to provide the first switching control signal to turn off the first switching device; and
an active shunt circuit including a capacitor and a plurality of transistors operative according to at least one shunt circuit switching control signal to provide a shunt circuit output voltage signal to a shunt circuit output at a shunt circuit voltage level less than the DC input voltage in the second mode;
wherein the switching control circuit is operative in the second mode to provide the second switching control signal and the shunt circuit switching control signal to control the output voltage signal.

17. The power conversion system of claim 16, wherein the active shunt circuit includes:
a first transistor coupled between the DC input node and a first internal node, the first transistor operative according to a first shunt circuit switching control signal,
a second transistor coupled between the first internal node and the shunt circuit output, the second transistor operative according to a second shunt circuit switching control signal,
a third transistor coupled between the shunt circuit output and a second internal node, the third transistor operative according to a third shunt circuit switching control signal, and
a fourth transistor coupled between the second internal node and the constant voltage node, the fourth transistor operative according to a fourth shunt circuit switching control signal;
wherein the capacitor is coupled between the first and second internal nodes;
wherein the switching control circuit is operative in the first mode to provide the shunt circuit switching control signals to turn off the first, second, third and fourth transistors;
wherein the switching control circuit is operative in the second mode to provide the shunt circuit switching control signals in a repeating sequence of a first phase, a second phase, and a third phase, the repeating sequence including providing the shunt circuit switching control signals in the first phase to turn on the first and third transistors and turn off the second and fourth transistors to charge the capacitor through the shunt circuit output, providing the shunt circuit switching control signals in the second phase to turn off the first, second, third and fourth transistors, and providing the shunt circuit switching control signals in the third phase to turn off the first and third transistors and turn on the second and fourth transistors to discharge the capacitor through the shunt circuit output.

18. The power conversion system of claim 16, further comprising a third switching device coupled between the shunt circuit output and the switching node, the third switching device operative according to a third switching control signal;

wherein the active shunt circuit includes:
- a first transistor coupled between the DC input node and a first internal node, the first transistor operative according to a first shunt circuit switching control signal,
- a second transistor coupled between the first internal node and the shunt circuit output, the second transistor operative according to a second shunt circuit switching control signal,
- a third transistor coupled between the shunt circuit output and a second internal node, the third transistor operative according to a third shunt circuit switching control signal,
- a fourth transistor coupled between the second internal node and the constant voltage node, the fourth transistor operative according to a fourth shunt circuit switching control signal, and wherein the capacitor is coupled between the first and second internal nodes;

wherein the switching control circuit is operative in the first mode to provide the third switching control signal to turn off the third switching device; and wherein the switching control circuit is operative in the second mode to provide the second and third switching control signals to control the output voltage signal.

19. The power conversion system of claim 16, wherein the switching control circuit is operative in the second mode to provide the shunt circuit switching control signal to control the shunt circuit voltage level at approximately half the input voltage; and wherein the threshold voltage is less than a rated blocking voltage of the second switching device.

20. A power supply circuit to provide a DC output voltage signal, comprising: a high side switching device coupled between a DC input node and a switching node, the switching node connected to an output inductor to provide the DC output voltage signal at an output node; a low side switching device coupled between the switching node and a constant voltage node; a control circuit operative when a DC input voltage at the DC input node is less than a threshold voltage to operate the first and second switching devices in alternating fashion to regulate the DC output voltage signal; and a second supply circuit coupled to receive the DC input voltage, the second supply circuit including a capacitor and a plurality of transistors selectively operative to provide a voltage signal at a level less than the DC input voltage at the DC input node; the control circuit operative when the DC input voltage is greater than the threshold voltage to turn off the high side switching device, and to operate the low side switching device and at least one of the plurality of transistors of a shunt circuit to provide to control the DC output voltage signal.

21. The power supply circuit of claim 20, wherein the control circuit is operative when the DC input voltage is greater than the threshold voltage to cause the second supply circuit to provide the voltage signal at a voltage less than a rated blocking voltage of the low side switching device.

22. The power supply circuit of claim 20, wherein the threshold voltage is less than a rated blocking voltage of the low side switching device.

* * * * *